United States Patent [19]
Baker et al.

[11] Patent Number: 5,384,719
[45] Date of Patent: Jan. 24, 1995

[54] IMAGE GENERATOR FOR SIMULATING THE ILLUMINATION EFFECTS OF A VEHICLE-MOUNTED LIGHT SOURCE ON AN IMAGE DISPLAYED ON A SCREEN

[75] Inventors: Stephen J. Baker, Horley; Karl J. Wood, Crawley; Graham J. Olive; Jeffrey N. Smith, both of Burgess Hill, all of United Kingdom

[73] Assignee: Rediffusion Simulation Limited, Sussex, United Kingdom

[21] Appl. No.: 960,402
[22] PCT Filed: Jun. 3, 1991
[86] PCT No.: PCT/GB91/00884
§ 371 Date: Jan. 15, 1993
§ 102(e) Date: Jan. 15, 1993
[87] PCT Pub. No.: WO91/19280
PCT Pub. Date: Dec. 12, 1991

[30] Foreign Application Priority Data
Jun. 1, 1990 [GB] United Kingdom ........... 9012273

[51] Int. Cl.⁶ ................................... G06F 15/60
[52] U.S. Cl. ................................... 364/578; 434/44
[58] Field of Search .............. 364/578, 514, 516; 356/4; 358/104; 434/38, 39, 40, 41, 42, 44

[56] References Cited
U.S. PATENT DOCUMENTS

| | | | |
|---|---|---|---|
| 3,612,761 | 10/1971 | Wolff | 358/104 |
| 3,675,344 | 7/1972 | Williams et al. | 358/104 |
| 3,996,672 | 12/1976 | Osofsky | 358/104 |
| 3,996,673 | 12/1976 | Vorst et al. | 358/104 |
| 4,027,403 | 6/1977 | Marsh et al. | 358/104 |
| 4,348,184 | 9/1982 | Moore | 434/42 |
| 4,404,553 | 9/1983 | Cuffia | 358/104 |
| 4,419,731 | 12/1983 | Puffett | 356/4 |
| 4,511,337 | 4/1985 | Fortunato et al. | 434/43 |
| 4,709,231 | 11/1987 | Sakaibara et al. | 340/729 |
| 5,268,996 | 12/1993 | Steiner et al. | 395/126 |

FOREIGN PATENT DOCUMENTS

| | | |
|---|---|---|
| 2177577 | 1/1987 | United Kingdom . |
| 2204208 | 11/1988 | United Kingdom . |
| 2223384 | 4/1990 | United Kingdom . |
| 7900830 | 10/1979 | WIPO . |
| 8201782 | 5/1982 | WIPO . |
| 9006561 | 6/1990 | WIPO . |

OTHER PUBLICATIONS

Gonzalez et al., "Digital Image Processing"; Addison-Wesley (1987).
Foley and Van Dam: "Fundamentals of Interactive Computer Graphics," 1984 Addison Wesley, Chapter 16.
ACM Transactions on Graphics, vol. 6, No. 3, Jul. 1987, pp. 215–237, Klassen: "Modelling the Effects of the Atmosphere on Light,".

*Primary Examiner*—Ellis B. Ramirez
*Attorney, Agent, or Firm*—Nixon & Vanderhye

[57] ABSTRACT

A method and apparatus for simulating the illumination effects of a vehicle-mounted light source in an image displayed on a screen. The image is intended to represent the appearance of a model defined in a database in world space coordinates from and eyepoint position in world space, the model being defined in terms of a plurality of features each having predetermined attributes. The vehicle-mounted light source is defined in terms of an origin and a direction in eyepoint space. For each feature potentially contributing to the image, the angular position of a point on that feature relative to the light source is calculated as the angle between the light source direction and a line drawn to that point from the light source. An illumination intensity for that point is determined by reference to the calculated angle, and the illumination intensity is reduced as a function of the distance from the eyepoint to the said point to provide a resultant intensity. The attributes of the feature at the said point are modulated as a function of the resultant intensity.

18 Claims, 6 Drawing Sheets

IMAGE GENERATOR FOR SIMULATING THE ILLUMINATION EFFECTS OF A VEHICLE-MOUNTED LIGHT SOURCE ON AN IMAGE DISPLAYED ON A SCREEN

BACKGROUND OF THE INVENTION

1. Field of the Invention

The present invention relates to an image generator, and in particular to a computer image generator suitable for generating information in real time from which an image can be derived for display in for example a flight simulator.

2. Related Art

Real time image generators for flight simulators are used to simulate images which are presented to pilots who are positioned in a mock aircraft cockpit. The intended viewer of the image produced by the system, that is the simulator "pilot", looks out through an imaginary window into a three-dimensional (3-D) world defined by information stored as geometrical and other characteristic attribute data in a main database. A line drawn from the eyepoint through the window intersects a point in the 3-D world. The colour and intensity of that point must be "painted" on the window at the point of intersection of that line with the window.

The displayed image is made up from a series of picture elements (pixels) each of which is of uniform colour and intensity, the colour and intensity of each pixel being a function of the position of the eyepoint relative to the 3-D world which the stored data represents. In a real time display where hundreds of thousands of pixels must be updated sufficiently quickly to avoid jumping of the image, it is necessary to perform many millions of calculations per second to maintain image fidelity.

The position of the eyepoint relative to the database changes over time in response to the manipulation of the flight controls of the simulated aircraft. At any point in time the simulator produces an output indicating the eyepoint position in world space coordinates, that is the coordinate system of the database, and indicating the viewing direction, that is a vector drawn from the pilot's eyepoint through the centre of the viewing window. The database stores data identifying the position and orientation of a large number of features that may contribute to the final image. The image generator calculates which of the features is visible for the given eyepoint, the position of the boundaries of the features relative to the viewing window, and the attributes such as colour and intensity of the visible features. Occultation of one feature by another must be taken into account, and in high quality systems the effects of one translucent feature occulting another must also be taken into account.

The content of the database is used to derive the colour and intensity information for each pixel of the image to be displayed on a screen placed in front of the simulator pilot. The centre of each pixel is on a unique predetermined imaginary viewing line extending from the eyepoint to the screen and notionally extending through the screen onto the surface of the model defined in the database. This means that the world space coordinate system of the database must be transformed using the eyepoint coordinates into a coordinate system having the eyepoint as its origin, that is an eyepoint space coordinate system, and the information must then be transformed from eyepoint space into a screen space coordinate system. The screen space coordinate system is two dimensional, having its origin at the centre of the display screen. These transformations enable the surface areas of the modelled features which determine the colour and intensity of each pixel (for which the screen space coordinates are known) to be determined. Once the features contributing to a particular pixel have been identified, the colour, intensity and other attributes of those features can be obtained from the database and appropriate calculations performed to determine the final displayed colour and intensity of the pixel.

If a high quality image is to be achieved, the final pixel colour and intensity must be based on a number of samples of the contributing features taken at sampling points distributed across each pixel. For each feature making a contribution to an image it is necessary to determine whether or not that feature overlaps each point in screen space corresponding to a sampling point.

In most known CIG systems, the world space model is defined as a series of polygonal features. Light point features can also be displayed in some systems. In the case of polygonal features, each polygon is described in the database by the world space coordinates of at least its vertices, and these geometrical attributes must be transformed into screen space coordinates to take account of the position and orientation of the eyepoint. This involves an initial world space to viewpoint space transformation, followed by a viewpoint space to screen space transformation. The transformations are computationally intensive operations but do enable realistic images to be displayed. In the case of a light point feature, it may be described in the database by for example a position (coordinate of the light point centre) in world space. The position is transformed to screen space, and the feature can then be displayed on a circular area of the screen centred on the transformed position and having a radius which is a function of range, that is distance from the eyepoint.

CIG systems are known which can simulate the visual effects of landing lights. For example, U.S. Pat. No. 4,511,337 describes a system which is capable of simulating the illumination of the ground resulting from light carried by an aircraft, including variations in the position, shape and size of the area illuminated with variations in the altitude and attitude of the aircraft. This known system essentially displays a conic section and can produce acceptable results when simulating the illumination of a planar ground surface, e.g. a runway. In common with other attempts to simulate landing lights however this known system cannot produce acceptable results when landing lights are required to illuminate other than the ground plane. For example, if an aircraft approaches a terminal building, the "illuminated area" does not follow walls of the building but rather "illuminates" the ground plane within the building. Striking visual cues are thus lost or gross errors appear in the simulated scene.

Another problem associated with the simulation of aircraft and other vehicle lights is that of fog illumination. In some CIG systems, it is possible to simulate the effects of fog in obscuring the visibility of model features viewed through the fog by modulating the colour and intensity of the feature in accordance with the colour and density of the fog and the distance between the observer and the feature. In the case of vehicle lights however a great deal of the visible effects of the lights results from scattering of light back to the observer in the vehicle.

SUMMARY OF THE INVENTION

It is an object of the present invention to obviate or mitigate the problems outlined above.

According to the present invention there is provided a method for simulating the illumination effects on a model of a vehicle mounted light source in an image displayed on a screen, the image being intended to represent the appearance of the model which is defined in a database in world space coordinates from an eyepoint position in world space, the model being defined in terms of a plurality of features each having predetermined attributes, and the vehicle mounted light source being defined in terms of an origin and a direction in eyepoint space, wherein a. for each feature potentially contributing to the image, the angular position of a point on that feature relative to the light source is calculated as the angle between the light source direction and a line drawn to that point from the light source, b. an illumination intensity for that point is determined by reference to the calculated angle, c. the illumination intensity is reduced as a function of the distance from the eyepoint to the said point to provide a resultant intensity, and d. the attributes of the feature at the said point are modulated as a function of the resultant intensity.

The invention also provides an apparatus for simulating the illumination effects on a model of a vehicle mounted light source in an image displayed on a screen, the image being intended to represent the appearance of the model which is defined in a database in world space coordinates from an eyepoint position in world space, the model being defined in terms of a plurality of features each having predetermined attributes, and the vehicle mounted light source being defined in terms of an origin and a direction in eyepoint space, comprising a. means for calculating, for each feature potentially contributing to the image, the angular position of a point on that feature relative to the light source as the angle between the light source direction and a line drawn to that point from the light source, b. means for determining an illumination intensity for that point by reference to the calculated angle, c. means for reducing the illumination intensity as a function of the distance from the eyepoint to the said point to provide a resultant intensity, and d. means for modulating the attributes of the feature at the said point as a function of the resultant intensity.

Preferably, the screen is divided into a plurality of display cells each covering an array of pixels, the said angle is calculated at each display cell corner, the said resultant illumination intensity is determined at each display cell corner, and the illumination intensity at each pixel is determined by interpolation from the resultant illumination intensities at the respective display cell corners.

The cosine of the said angle may be calculated from the dot product of a vector representing the said direction of the light source and a vector directed from the light source to the said point on the feature.

Preferably the square of the cosine of the said angle is calculated from:

$$\cos^2\theta = \frac{[x_s L_x + y_s L_y + L_z - L_o/z_p]^2}{[srcf^2 - (2/z_p)(x_s X_o + y_s Y_o + Z_o) + L_d/z_p^2]}$$

where $L_x = l_x/d_x$, $L_y = l_y/d_y$, $L_z = l_z$, $X_o = x_o/d_x$, $Y_o = y_o/d_y$, $Z_o = z_o$, $(l_x, l_y, l_z)$ are the components of the vector representing the said direction of the light source.

$(x_s, y_s)$ are the screen space coordinates of the said point.

$(x_o, y_o, z_o)$ are the eyepoint space coordinates of the light source $(x_p, y_p, z_p)$ are the eyepoint space coordinates of the said point srcf is a slant range correction factor $L_o = x_o l_x + y_o l_y + z_o l_z$ $L_d + x_o^2 + y_o^2 + z_o^2$ $d_x$ and $d_y$ are functions of the half angle of the display Illumination intensities are preferably calculated each frame for each of a predetermined number of sample angles, the calculated values are stored in a look up table, and the stored values are addressed by the calculated said angle to derive the appropriate illumination intensities.

Preferably, range attenuation factors which are a function of range squared are calculated for the light source and stored in a look up table, and the stored values are addressed by the square of the range to derive the appropriate range attenuation factor.

The invention further provides a method for simulating the illumination effects on the atmosphere of a vehicle mounted light source in an image displayed on a screen, the image being intended to represent the appearance of a model which is defined in a database in world space coordinates from an eyepoint position in world space, the model being defined in terms of a plurality of features each having predetermined attributes, and the vehicle mounted light source being defined in terms of an origin and a direction in eyepoint space, wherein a. a triangular beam polygon is defined having one apex at the origin of the light source, the beam polygon lying in a plane including an axis through the origin parallel to the said direction, being normal to a line drawn from the eyepoint and intersecting the said axis, and having a defined length and half angle from the said one vertex, b. second and third vertices of the beam polygon are calculated, c. the intensity of illumination of the beam polygon is calculated as a function of distance from the light source, and d. the beam polygon is displayed on the screen in accordance with its calculated vertices and intensity.

Preferably, a plane equation $Ax + By + Cz + D = 0$ is calculated for the beam polygon from coordinates of the origin of the light source and components of a vector corresponding to the said axis, and the second and third vertices are calculated from the plane equation and the said defined length and half angle.

The invention also provides an apparatus for simulating the illumination effects on the atmosphere of a vehicle mounted light source in an image displayed on a screen, the image being intended to represent the appearance of a model which is defined in a database in world space coordinates from an eyepoint position in world space, the model being defined in terms of a plurality of features each having predetermined attributes, and the vehicle mounted light source being defined in terms of an origin and a direction in eyepoint space, the apparatus comprising a. means for defining a triangular beam polygon having one apex at the origin of the light source, the beam polygon lying in a plane coincident with an axis through the origin parallel to the said direction, being normal to a line drawn from the eyepoint and intersecting the said axis, and having a defined length and half angle from the said one vertex, b. means for calculating second and third vertices of the beam polygon, c. means for calculating the intensity of illumination of the beam polygon as a function of distance from the light source, and d. means for displaying the beam polygon on the screen in accordance with its calculated vertices and intensity.

BRIEF DESCRIPTION OF THE DRAWINGS

An embodiment of the present invention will now be described, by way of example, with reference to the accompanying drawings, in which.

DETAILED DESCRIPTION OF EXEMPLARY EMBODIMENTS

Figure 1:
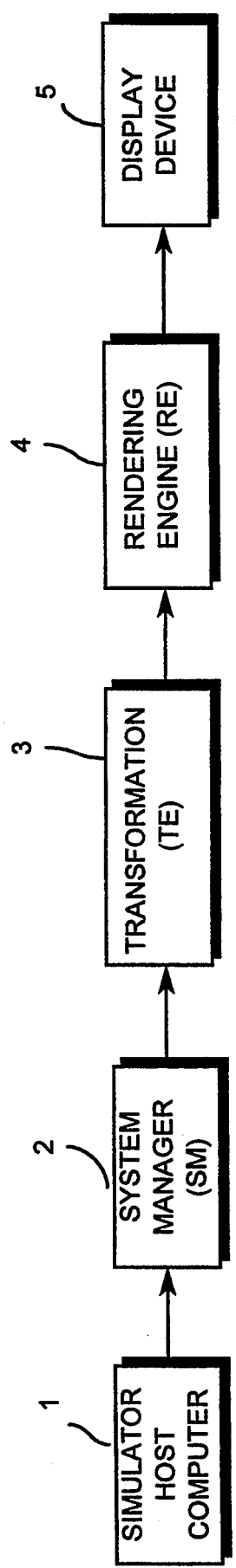
FIG. 1 is a schematic illustration of the basic configuration of a CIG system in accordance with the present invention.

Referring to FIG. 1, this illustrates the basic functional components of an embodiment of the present invention adapted for use in a flight simulator. The simulator incorporates a host computer 1 which provides outputs corresponding to the position and attitude of the simulated aircraft relative to a world space model of the earth surface. An image is to be displayed which is representative of the appearance of the model surface to an observer in the simulated aircraft. In the described embodiment, the image is projected onto a back projection screen. The observer views the reflection of the back projection screen in a large spheroidal mirror. It will be appreciated however that alternative display systems may be used.

A system manager (SM) 2 receives the outputs of the host computer 1 describing the aircraft position and attitude and downloads from a database model-describing data corresponding to those portions of the model which are potentially visible from the observer's eyepoint given the position and attitude of the simulated aircraft. The image is projected as a plurality of raster scanlines. Calligraphic light points could be superimposed on the image raster using conventional techniques.

The model-describing data is predetermined during model production but will describe features of the modelled scene, for example runways, buildings and fields, in terms related to a set of world space coordinates with a predetermined origin. The model may include a variety of different feature types, for example straight edged polygonal features, and circular light points. The model describing data is hierarchically ordered such that most individual features of the model are defined by reference to objects of which they form a part, and those objects are in turn defined by reference to other objects in the model. Thus the model world will generally define a feature in "object space", that is with reference to a coordinate system having its origin and axes related to an object such as a building. The coordinate system of that object is then referenced to world space coordinates either directly or through one or more further objects. The term "world space coordinates" is used herein to include both direct reference to the coordinate system of the main database and indirect reference to the coordinate system of the main database through one or more "object spaces".

The extracted model-describing data is passed to a transformation engine (TE) 3 which performs two main functions, that is geometric transformation of model feature data from the database or world space coordinate system to the observers or eyepoint coordinate system, and perspective transformation from the 3-D eyepoint coordinate system to a 2-D screen space coordinate system. The techniques used to achieve such transformations are well known and accordingly are not elaborated in detail here.

The TE 3 provides a stream of model-describing data in screen coordinates to a rendering engine (RE) 4. The RE 4 performs a number of functions using model feature geometric attribute data (e.g. size and position) and model feature non-geometrical attribute data (e.g. colour, translucency) received from the TE 3 to produce a final colour for each pixel of the image to be displayed. Data representing the non-geometrical attribute data is loaded into a frame store within the RE 4, the frame store having a storage address in respect of each pixel in the final display. The contents of the frame store are down loaded to display device 5 which produces the final image. The system thus has four main pipeline stages; such that as one image frame is being displayed, the next frame to be displayed is being rendered in the RE 4, the next but one frame to be displayed is being processed in the TE 3, and the next but two frame to be displayed is being processed in the SM 2. Each stage is separated from the or each adjacent stage by a double buffered store. A frame swap signal is generated to cause all the double buffered stores to swap in unison. Thus data relevant to one frame is effectively "clocked" through the pipeline by the frame swap signal.

Figure 2:
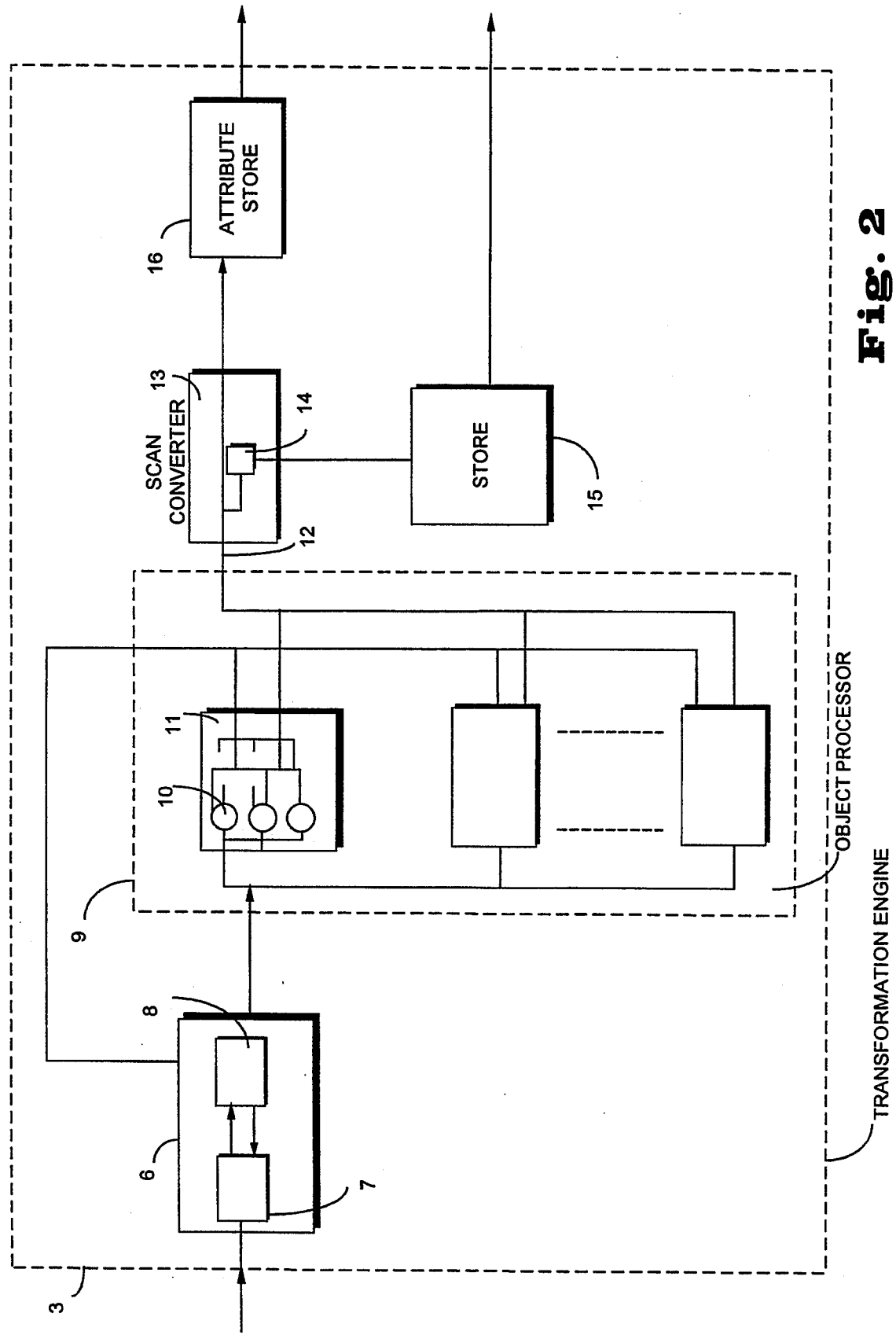
FIG. 2 is a schematic illustration of a transformation engine suitable for use in a system of the type illustrated generally in FIG. 1.

FIG. 2 illustrates the TE 3 of FIG. 1 in more detail. The TE processes data previously read out from the SM 2 into a channel active database (CADB) 6. The contents of the CADB 6 corresponds to all the data within the main database which is within potentially visible range of the eyepoint. The CADB 6 comprises a memory 7 and control logic 8 which controls the read out data from the memory to an array of object processors 9 that in turn provides control inputs to the control logic 8. The memory 7 holds the entire active database and the control logic 8 selects object data for processing. The object processor array 9 comprises individual object processors 10 arranged in groups on respective boards 11. These processors form the main computational element of the TE 3.

A common output 12 of the object processor array 9 is delivered to a scan converter 13 incorporating a logic unit 14 providing an output to a scan converter store 15. An attribute store 16 receives input via the scan converter 13. The stores 15 and 16 provide the outputs of the TE 3 to the rendering engine RE 4.

The object processors 10 perform a variety of functions, including controlling the distribution of data to the object processor in an efficient manner, performing a range cull to discard all objects which are at a range too great for them to be visible from the eyepoint, and performing a field of view cull to discard all objects which are completely outside the field of view given by the position of the viewing window or screen relative to the eyepoint. For all features not culled in this processing, the geometrical attributes must be processed. This processing includes a series of basic procedures, such as backface removal (culling all features that cannot be seen from the eyepoint as they face away from the eyepoint), plane equation attribute calculation (using the coefficients of the plane in eyepoint space of each feature that is potentially visible), and field of view culling (culling all features which are completely outside the field of view represented by the viewing window). These procedures are not directly relevant to the present invention and therefore will not be described in detail herein. The transformation engine does transform data required for the simulation of landing lights in accordance with the present invention and this processing is described in detail below.

Subdivision of display screen

Figure 3:
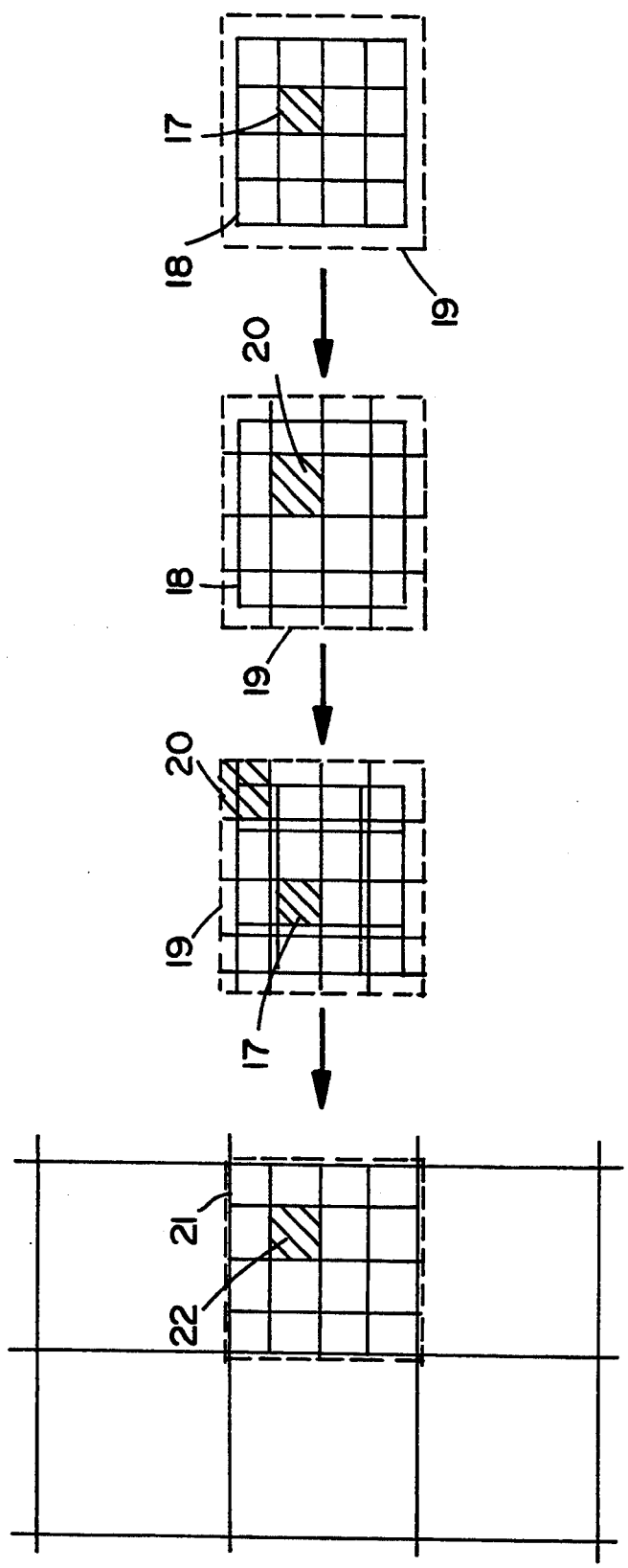
FIG. 3 illustrates the inter-relationship between various sub-areas of screen space in the embodiment of the present invention.

The displayed image is made up from a regular array of pixels which do not overlap and which together cover all of the screen. Each pixel is projected by the raster scan display device as an area of uniform colour and intensity. FIG. 3 includes four illustrations of various subdivisions of the screen, the leftmost illustration being to one quarter of the scale of the three other illustrations.

In FIG. 3, the shaded areas identified by reference numeral 17 each correspond to one pixel. The screen is divided into sub-areas or cells each covering a respective rectangular array of pixels, in the illustrated case a four by four array. Numeral 18 in FIG. 3 points to the boundary of one cell. Adjacent cells do not overlap. Superimposed on each cell is a pseudocell which covers the respective cell and a half pixel boundary around that cell. Broken lines 19 in FIG. 3 correspond to a pseudocell boundary. Thus adjacent pseudocells overlap each other. Each pseudocell is divided into a regular array of abutting pseudopixels, e.g. a four by four array of pseudopixels. The shaded areas 20 in FIG. 3 each correspond to one pseudopixel. Superimposed on the pseudocells are supercells, each covering a respective rectangular array of pseudocells, e.g. a four by four array of pseudocells in the illustrated case. Thus adjacent supercells overlap each other. The broken line 21 indicates a supercell boundary, and shaded area 22 one pseudocell within that supercell. Thus each supercell covers sixteen pseudocells, and those sixteen pseudocells together cover sixteen cells plus a half pixel wide boundary around the edge of those sixteen cells. It is necessary for adjacent supercells, adjacent pseudocells and adjacent pseudopixels to overlap to achieve anti-liaising.

For the illustrated case of a four by four pixel cell, and a four by four pseudocell supercell, and assuming a display area of 1024 by 1024 pixels, there are 64×64 supercells and 256×256 pseudocells.

Scan converter

For each feature delivered to the scan converter (FIG. 2) by the object processors, the scan converter identifies all of the supercells which are at least partially overlapped by that feature. The scan converter assigns an identity (ID) to each feature, locates the supercells impacted by that feature, and passes the feature ID to the scan converter store 15 (hereinafter referred to as the supercell store).

The Rendering Engine

Figure 4:
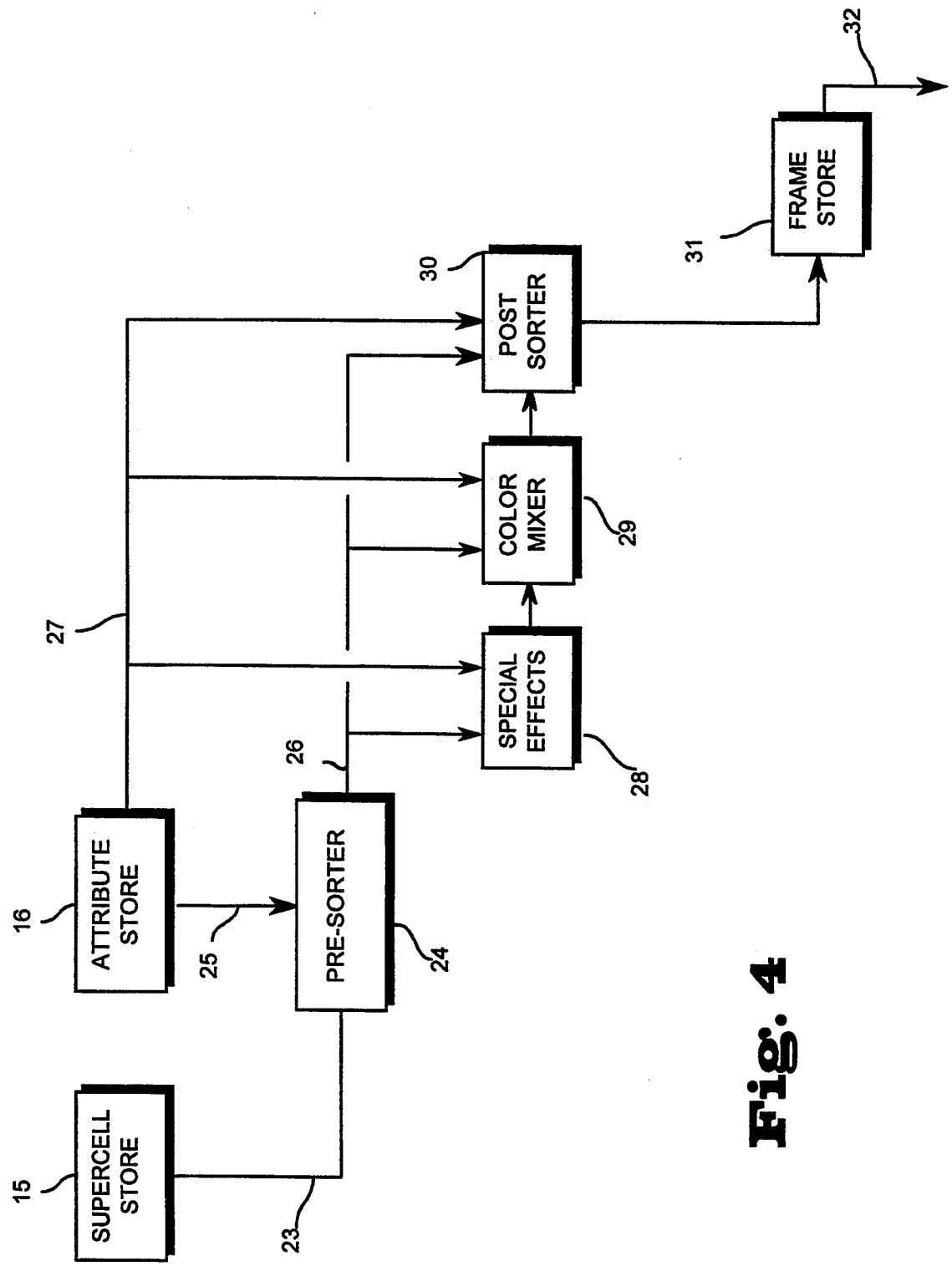
FIG. 4 is a schematic illustration of basic components of the rendering engine described in outline with reference to FIG. 1.

The RE 4 of FIG. 1 will now be described in outline with reference to FIG. 4. FIG. 4 shows the supercell store 15 and attribute store 16 of FIG. 2. It will be recalled that the supercell store and attribute store are both double-buffered, the contents of the stores being read out in response to receipt of a start of frame signal. The content of the supercell store is read out on output 23 supercell by supercell into a presorter 24 which also receives geometrical attribute data from the attribute store 16 on output 25. The presorter and attribute store provide respective outputs 26 and 27 to a special effects module 28, a colour mixer 29, and a postsorter 30. The postsorter 30 feeds raster image data to a frame store 31 and an output 32 from the frame store is delivered to the display device (display device 5 of FIG. 1).

The function of the presorter 24 is to subdivide each supercell into a series of pseudocells, to compute the effective depth (distance from the eyepoint) of each feature at each pseudocell corner, to detect any feature which is opaque and fully covers a pseudocell, and to discard any features from consideration in respect of any one pseudocell if such features lie behind an opaque feature fully covering that pseudocell. Thus given a pseudocell size which is four by four display pixels plus a half pixel boundary, each supercell ID list will be considered for each of sixteen pseudocells in turn.

The IDs accumulated in the supercell store 15 are downloaded to the presorter 24 one stack at a time. Corresponding attributes are simultaneously downloaded to the presorter from the attribute store 16. Thus the presorter receives the contents of one stack, corresponding to one supercell, and processes the features identified by the stack contents, before the next stack is downloaded.

If the presorter indicates that a feature impacts (at least partially covers) the pseudocell being processed, a "fragment" data packet is generated and applied to the fragment carrying output bus 26. This data packet comprises only the screen space coordinates of the four corners of the relevant pseudocell and the impacting feature ID. The fragments of features thus identified are then processed in the special effects module 28, the colour mixer 29, and the postsorter 30.

The units 28 to 30 operate on the basis of pseudopixels. In the illustrated case sixteen pseudopixels fully cover (but do not extend beyond) a respective pseudocell. The corners of the pseudopixels are interpolated from the corners of the relevant pseudocell carried by the fragment bus. As described in more detail below, the special effects module 28 generates, for each pseudopixel of the pseudocell being processed, an output appropriate to the simulation of landing lights. The special effects module may also produce outputs appropriate to any other special effects the attributes of the feature being processed demand, e.g. texture effects or fog effects. The special effect outputs are applied to the colour mixer 29 where further effects such as ambient lighting are processed, the colour mixer delivering an RGBT (red, green, blue, translucency) output for each pseudopixel to the postsorter 30. The postsorter provides an output to the frame store 31. The frame store provides output 32 to the raster display device 5 (FIG. 1).

The function of the postsorter 30 is to resolve the effects of surfaces hiding or partially hiding other surfaces. It does this by assessing the impact of features on an array of sampling points, accumulating and weighting the effects of such impacts, and providing a final RGB output for each display pixel to the frame store. Each pseudopixel fragment received by the postsorter covers a respective array of sampling points distributed across the pixel array corresponding to each pseudocell. Typically there may be two hundred sampling points, that is eight per pixel. (It will be recalled that each pseudocell in the described example covers a four by four pixel array plus a half pixel wide boundary). The position of every sampling point relative to the four by four pseudopixel array defined for each pseudocell is known, and therefore it is necessary to decide, for each sampling point, whether or not a feature impacts that point, and only if impact is detected to accumulate the RGBT inputs to the postsorter from the corresponding pseudopixel.

Each sampling point may be overlapped by a large number of features and it is necessary to depth sort those features to discard those which are fully occulted by nearer (to the eyepoint) opaque features at that sampling point. To this end, the distance (from the eyepoint) of each feature at each sampling point is calculated. The RGBT and depth of the first feature impacting a sampling point is loaded into a respective store. Subsequent features are depth compared with the first stored feature, features being discarded from the store (or not entered) except for the current nearest opaque feature and translucent features nearer than the nearest opaque feature. Once all the features potentially relevant to a cell have been so processed, the cumulative effects of all the features identified in each stack are calculated to produce a final RGB output for each sampling point. Those outputs are then weighted and accumulated to produce a single RGB for each pixel. Each pixel will respond to contributions from the eight sampling points within its own boundary and sampling points within a half pixel wide border therearound, that is thirty-two sampling points in all ($1 \times 8 + 4 \times 4 + 4 \times 2$). The total area covering the thirty-two sampling points is thus equal to the area of a two by two pixel array but is centered on the centre of one display pixel.

The attribute store 16, supercell store 15, and frame store 53 are all double-buffered so as todefine the boundaries between separate stages in the pipe-lined system.

The system described and outlined above is of a type to which the present invention may be applied, although it will be appreciated that the present invention may be applied in systems having a different general structure. In the system described above, the present invention is implemented within the special effects module and the colour mixer and accordingly the functions of these components will now be described in greater detail.

Figure 5:
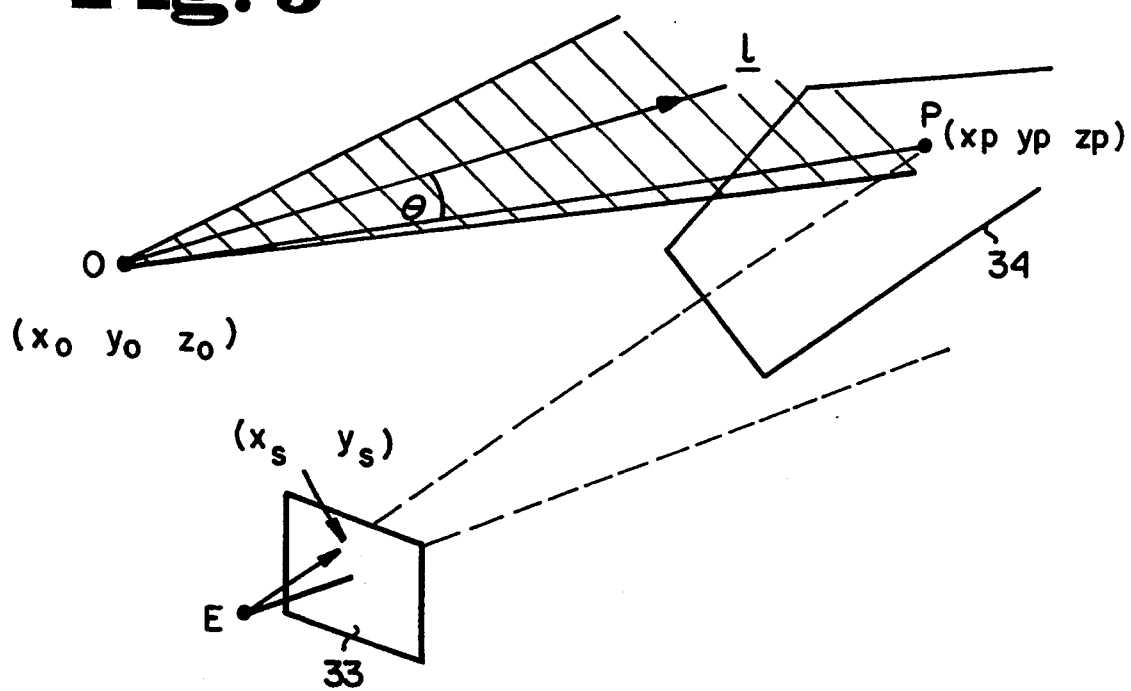
FIG. 5 schematically illustrates the geometry of landing light simulation in accordance with the present invention.

Referring to FIG. 5, this illustrates the basic geometry of landing light simulation in an embodiment of the present invention. An observer at eyepoint E is presented with an image projected onto a screen 33, that image being intended to represent a scene made up from a number of features including a polygon 34 part of which is illuminated by a beam from a landing light. The landing light casts a conical beam of light from source O, the beam centre axis coinciding with the major axis of the cone. The beam axis is represented by vector 1.

To an observer at O, the apparent shape of the 'footprint' formed by the beam illuminating any surface would be circular. To an observer at E, the apparent shape is a function of the angle between the beam centre axis and the normal to any surface it strikes. A beam illuminating the foot of a corner of a building would appear to an observer at E to produce a shape made up from three partial conic sections, one for the ground plane, and one each for the two walls meeting at the corner.

In the illustrated case, part of the polygon 34 is illuminated by the beam and part is not. For a point P on the polygon to be illuminated by the beam the angle $\theta$ between the beam axis and a line drawn from the light source origin must be less than the half angle of the beam. The intensity of illumination of a point within the beam will also be a function of $\theta$, the intensity profile of light beams generally being non-linear, for example Gaussian such that intensity is greatest on the beam axis and falls non-linearly with angular deviation from the beam axis. Other intensity profiles are of course possible. Thus for the point P to be correctly illuminated it is necessary to calculate the angle $\theta$ and the amount of light falling on a point located on any line substending angle $\theta$ with the beam axis.

Cos $\theta$ may be derived from:

$$\underline{OP} \cdot \underline{l} = |OP||l| \cos \theta$$

where $\underline{OP}$ is the vector from the light source O to the point P $\overline{l}$ is the beam axis direction vector By selecting the magnitude of l to be one, we have:

$$\text{Cos } \theta = (\underline{OP} \cdot \underline{l})/|OP|$$

But $\underline{OP} = \underline{EP} - \underline{EO}$, and thus:

$$\begin{aligned}\text{Cos } \theta &= [(\underline{EP} - \underline{EO}) \cdot \underline{l}]/|OP| \\ &= [\underline{EP} \cdot l - \underline{EO} \cdot \underline{l}]/|OP| \\ &= [x_p l_x + y_p l_y + z_p l_z - (x_o l_x + y_o l_y + z_o l_z)]/|OP|\end{aligned}$$

where $(x_p y_p z_p)$ is the position of point P in eyepoint space $(x_o y_o z_o)$ is the position of the source O in eyepoint space.

The position of the point P can be computed from screen coordinates and Z depth $z_p$ by $$x_p = x_s z_p / d_x$$

$$y_p = y_s z_p / d_y$$

$$z_p = z_p$$

where $(x_s, y_s)$ are the screen coordinates of a point through which a line from E to P passes, and $d_x$ and $d_y$ are functions of the half angle of the display. Thus:

$$\cos\theta = [(x_s l_x/d_x + y_s l_y/d_y + l_z)z_p - L_o]/|OP|$$

where $L_o = x_o l_x + y_o l_y + z_o l_z$ is a constant for any one frame.

The value $|OP|$ can be calculated as follows:

$$|OP| = \sqrt{[(x_p - x_o)^2 + (y_p - y_o)^2 + (z_p - z_o)^2]}$$
$$|OP|^2 = x_p^2 + y_p^2 + z_p^2 - 2(x_p x_o + y_p y_o + z_p z_o) + (x_o^2 + y_o^2 + z_o^2)$$
$$= z_p^2 \cdot srcf^2 - 2(x_s x_o/d_x + y_s y_o/d_y + z_o)z_p + L_d$$

where $L_d = x_o^2 + y_o^2 + z_o^2$

Thus $|OP|^2 = z_p^2[srcf^2 - (2/z_p)(x_s x_o/d_x + y_s y_o/d_y + z_o) + L_d/z_p^2]$ and hence $$\cos^2\theta = \frac{[x_s l_x/d_x + y_s l_y/d_y + l_z) - L_o/z_p]^2}{srcf^2 - (2/z_p)(x_s x_o/d_x + y_s y_o/d_y + z_o) + L_d/z_p^2}$$

This can be simplified to:

$$\cos^2\theta = \frac{[x_s L_x + y_s L_y + L_z - L_o/z_p]^2}{[srcf^2 - (2/z_p)(x_s X_o + y_s Y_o + Z_o) + L_d/z_p^2]}$$

where $L_x = l_x/d_x$, $L_y = l_y/d_y$, $L_z = l_z$ and $X_o = x_o/d_x$, $Y_o = y_o/d_y$, $Z_o = z_o$ and are constant for any particular frame.

The factors which are constant for any one frame are calculated in the transformation engine and distributed to the special effects module in which further landing light simulation processes are executed. The transformation engine also transforms the landing light source and direction from world space to eyepoint space.

The special effects module performs the following tasks:

a. For each feature contributing to the image, e.g. the polygon of FIG. 5, $\cos^2\theta$ is calculated at each corner of each display cell. A display cell is the array of pixels overlapped by a respective pseudocell. Thus in the case illustrated in FIG. 3, each display cell is made up from an array of sixteen pixels, and adjacent display cells have coincident corners.

b. The intensity of illumination at each display cell corner is determined. This is achieved by looking up an appropriate intensity value $I_{int}$ from an intensity (angular) distribution table that has been previously established for the light source in question. The table is addressed by $\cos^2\theta$. c. The intensity value derived from the look-up table is reduced as a function of range. This is achieved by calculating range squared at each display cell corner and using it to address a look-up table in which attenuation factors $R_{att}$ are stored. The range r to any point P having eyepoint space coordinates $(x_p, y_p, z_p)$ could be derived from:

$$r = \sqrt{(x_p^2 + y_p^2 + z_p^2)}$$

The use of this equation in real time would be computationally intensive and therefore a slant range correction factor (srcf) is calculated where:

$$r = z_p srcf$$

and $srcf = \sqrt{[1 + (x_s/d_x)^2 + (y_s/d_y)^2]}$

Thus the resultant intensity $I_{res}$ is derived from the interpolated look up table intensity $I_{int}$ and the attenuation factor $R_{att}$ using the equation:

$$I_{res} = I_{int} R_{att}$$

d. The intensity at the centre of each of the sixteen pseudopixels forming the pseudocell overlapping the display cell is calculated by bi-linear interpolation of the $I_{res}$ values calculated for the display cell corners.

e. The sixteen interpolated intensity values are output to the colour mixer.

If there is more than one landing light it is necessary to perform the tasks of $\cos^2\theta$ calculation and intensity look-up for each landing light separately. For each landing light, an intensity is calculated at each cell corner. Thereafter the intensities for all the landing lights can be summed at each display cell corner and the summed intensities are then reduced as a function of range in a single process, prior to pseudopixel centre intensity value interpolation.

In the colour mixer, the intensity values for each pseudopixel are used in a conventional manner to modulate the attributes of features contributing to the image in accordance with the colour of the light source and its intensity at the feature. This may be achieved using conventional techniques however and therefore these techniques are not described further herein.

A landing light beam may be attenuated by fog. The intensity of light reaching a feature is reduced, as is the visibility of light travelling from the feature to the eyepoint. It is possible to take account of attenuation between the feature and the eyepoint by using a simple "fog" attenuation factor that is a function of range. Ideally, to take account of attenuation between the source and the feature, an attenuation factor should be used which is a function of source to feature distance. As a reasonable approximation however, it can be assumed that the source to feature distance is equal to the range.

The above description indicates how the illumination of features in the modelled world can be correctly simulated, but assumes that there is no scattering of light beams due to atmospheric effects such as rain or fog. In practice it is highly desirable to be able to simulate such effects. In accordance with the present invention this is achieved using a beam polygon the eyespace position of which is dependent upon the eyespace position of the light source and its direction.

Figure 6:
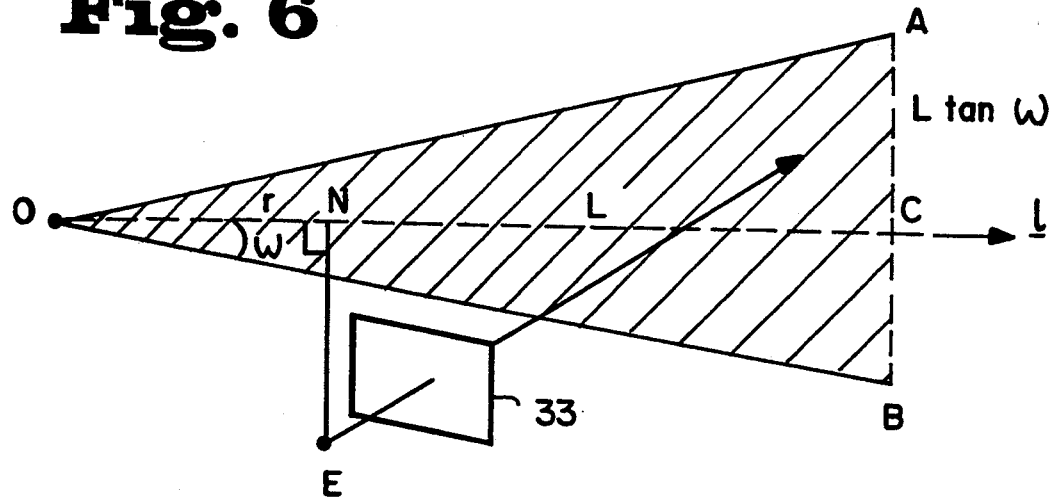
FIG. 6 illustrates the geometry of fog illumination by landing lights in accordance with the present invention.

Referring to FIG. 6, this illustrates the basic geometry. The eyepoint E and landing light source O are positioned relative to the screen 33 exactly as illustrated in FIG. 5. It is assumed however that there is no polygon in front of the light source to be illuminated. A portion of the beam is visible from the eyepoint E however through the screen 33. A beam polygon defined as a triangle having vertices A, B, O defines an area to be illuminated by the beam. The triangle ABO is isosceles and its axis OC coincides with the direction of the beam.

A line drawn from the eyepoint E to a point N on the axis OC is perpendicular to that axis. The coordinates of the point N are given by:

$$\underline{EN} = \underline{EO} + r\underline{l}$$

but $r = \underline{EO}.\underline{l} = x_o l_x + y_o l_y + z_o l_z = L_o$

Hence:

$$EN = \begin{pmatrix} x_o + L_o\, l_x \\ y_o + L_o\, l_y \\ z_o + L_o\, l_z \end{pmatrix}$$

given that the light source O has eyepoint coordinates $(x_o y_o z_o)$, and the beam axis $\underline{l}$ has components $(l_x l_y l_z)$ These are the components of the vector $\underline{EN}$ which is normal to the axis $\underline{l}$. The plane of the beam polygon is deemed to be perpendicular to the vector $\underline{EN}$, and thus the plane equation of the beam polygon can be formed as:

$$Ax + By + Cz + D = 0$$

where $$A = x_o + L_o l_x$$

$$B = y_o + L_o l_y$$

$$C = z_o + L_o l_z$$

$$D = -(Ax_o + By_o + Cz_o)$$

The thus derived plane equation is normalised and the vertices A and B of the beam polygon are formed as follows:

Vertex C (on the straight line AB) has coordinates $(x_c, y_c, z_c)$ and $$x_c = x_o + L\, l_x$$

$$y_c = y_o + L\, l_y$$

$$z_c = z_o + L\, l_z$$

where L is the length of the beam polygon. This length is determined when the light source is modelled.

A unit vector e along AB has components $(x_e, y_e, z_e)$ and $$x_e = C\, l_y - B\, l_z$$

$$y_e = A\, l_z - C\, l_x$$

$$z_e = B\, l_x - A\, l_y$$

$(x_e, y_e, z_e)$ is in fact the cross product of the unit vector $\underline{l}$ and the unit plane normal (A, B, C).

The vector $\underline{OA}$ is then given by:

$$\underline{OA} = \underline{OC} + e\, L \tan \omega$$

Where $\omega$ is the half angle of the beam polygon and vector $\underline{OB}$ is given by:

$$\underline{OB} = \underline{OC} - eL \tan \omega$$

hence $OA = L\,(1 + e \tan \omega)$, $OB = L\,(1 - e \tan \omega)$ and the coordinates of A are $(x_a\, y_a\, z_a)$ where:

$$x_a = x_o + L[l_x + (C\, l_y - B\, l_z) \tan \omega]$$

$$y_a = y_o + L[l_y + (A\, l_z - C\, l_x) \tan \omega]$$

$$z_a = z_o + L[l_z + (B\, l_x - A\, l_y) \tan \omega]$$

The coordinates of B may be similarly calculated.

Given the beam polygon vertices, an assessment of whether or not the beam polygon is visible from the eyepoint can be made in exactly the same manner as for any other polygon. These techniques will not be described further herein. The intensity of illumination of the polygon does require discussion however as this intensity is a function of distance from the light source.

In the case of conventional polygons illuminated by a landing light, intensity is reduced with polygon range from the eyepoint. In the case of beam polygons, the intensity of illumination reduces from a maximum at the light source towards the end of the beam polygon formed by line AB, and varies across the beam axis. Thus a further range attenuation look-up table is built up which is addressed by $|OP|^2 \cos^2 \theta$.

Given that $\cos^2 \theta$ is known as described above, then:

$$|OP|^2 \cos^2 \theta = z_p^2\, [x_s l_x/d_x + y_s l_y/d_y + l_z - L_o/z_p]^2$$

These terms have already been calculated as described above.

Once a beam polygon has been identified as impacting a particular sampling point, it is then processed as with any other polygon.

It will be appreciated that the beam polygon should be transparent to prevent it obscuring light points or other features located behind it, and to prevent it from being "illuminated" by other light sources.

Figure 7:
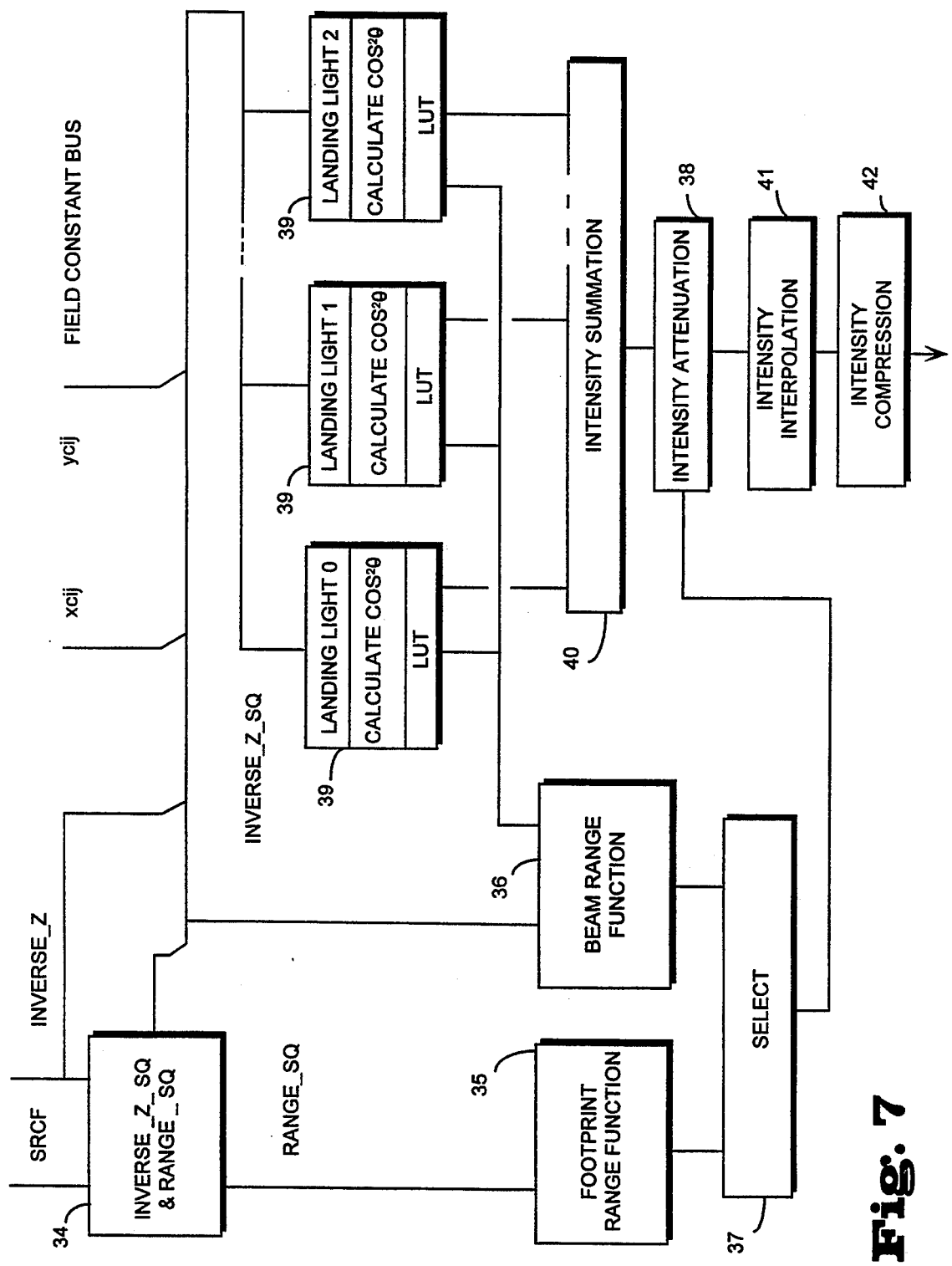
FIG. 7 illustrates the structure of a landing light processor according to the invention.

Referring now to FIG. 7, this illustrates the functional structure of a landing light processor for implementing the processes described above. Input to the processor are the slant range correction factor srcf, inverse z, the coordinates $(x_{cij}, y_{cij})$ of a display cell corner, and data that is constant per field, e.g. $L_o$. At any one time the processor is considering a point on a single polygon or other feature, the screen space coordinates of that point being $(x_{cij}, y_{cij})$. A processor 34 calculates range squared and inverse Z squared. Range squared is used via a footprint range function unit 35 to control range attenuation for conventional polygons illuminated by a landing light. Inverse Z squared is required for beam polygon range attenuation via a beam range function unit 36. The appropriate range function is selected by unit 37 in dependence upon the polygon type and intensity attenuation is processed in an intensity attentuation unit 38.

Three landing light units 39 are shown, although any desired number of units could be provided. Each independently calculates $\cos^2 \theta$ relative to its respective landing light, and addresses the appropriate entry in a look up table (LUT) to access the appropriate intensity data. Beam polygon intensity outputs are delivered to beam range function unit 36, and other outputs are delivered to an intensity summation unit 40 the output of which is delivered to the intensity attenuation processor 38. Intensity values for each pseudopixel within the display cell are then derived in an interpolator 41. Those values are then processed in compressor 42 and output to the colour mixer.

We claim:

1. A method for displaying an image simulating the illumination effects of a vehicle-mounted light source in an image displayed on a screen, the image being intended to represent the appearance of a model structure which is defined in a digital signal database in world space coordinates from an eyepoint position in world space, the model structure being defined in terms of a plurality of structural features each having predetermined structural attributes, and the simulated vehicle-mounted light source being defined in terms of an origin and a direction in eyepoint space, said method comprising the steps of:
- a. determining, for each structural feature potentially contributing to the displayed image, the angular position of a point on that structural feature relative to the light source as the angle between the light source direction and a line drawn to that point from the light source,
- b. determining an illumination intensity for that point by reference to said angle,
- c. reducing the illumination intensity as a function of the distance from the eyepoint to said point to provide a resultant intensity, and
- d. modulating the displayed attributes of the structural feature at said point in a displayed image on said screen as a function of said resultant intensity.

2. A method according to claim 1, wherein:

said screen comprises a plurality of display cells each covering an array of pixels, the said angle being determined at each display cell corner, said resultant illumination intensity also being determined at each display cell corner, and said illumination intensity at each pixel being determined by interpolation from the resultant illumination intensities at the respective display cell corners.

3. A method according to claim 1, wherein the cosine of the said angle is used to determine the illumination intensity and is itself determined from the dot product of a vector representing the said direction of the light source and a vector directed from the light source to the said point of the feature.

4. A method according to claim 3, wherein the determining an illumination intensity step is performed as a function of the square of the cosine of said angle which squared cosine is determined by processing digital electrical signals representing model and simulated light source data as summarized below:

$$\cos^2\theta = \frac{[x_s L_x + y_s L_y + L_z - L_o/z_p]^2}{[srcf^2 - (2/z_p)(x_s X_o + y_s Y_o + Z_o) + L_d/z_p^2]}$$

where $L_x = l_x/d_x$, $L_y = l_y/d_y$, $L_z = z$, $X_o = x_o/d_x$, $Y_o = y_o/d_y$, $Z_o = z_o$, $(l_x, l_y, l_z)$ are the components of the vector representing the said direction of the light source $(x_s, y_s)$ are the screen space coordinates of the said point $(x_o, y_o, z_o)$ are the eyepoint space coordinates of the light source $(x_p, y_p, z_p)$ are the eyepoint space coordinates of the said point srcf is a slant range correction factor $L_o = x_o l_x + y_o l_y + z_o l_z$ $L_d = x_o^2 + y_o^2 + z_o^2$ $d_x$ and $d_y$ are functions of the half angle of the display.

5. A method according to claim 1, wherein digital data representing illumination intensities are stored for each of a predetermined number of sample angles in a look up table in a digital data addressable memory, and the stored values in the digital data addressable memory are addressed by said angle to derive the appropriate illumination intensities.

6. A method according to claim 5, wherein the stored values are addressed by the square of said angle to derive the illumination intensity.

7. A method according to claim 1, wherein digital data representing range attenuation factors are stored in a look up table in a digital data addressable memory, and the stored values in addressable memory are addressed by the distance from the eyepoint to said point to derive an appropriate range attenuation factor to use in said reducing step.

8. A method according to claim 7, wherein the stored range attenuation factors are addressed by the square of the distance from the eyepoint to said point to derive a range attenuation factor.

9. A method as in claim 1 for displaying an image simulating the illumination effects on the atmosphere of a vehicle-mounted light source in an image displayed on a screen, the image being intended to represent the appearance of a model structure which is defined in a digital signal database in world space coordinates from an eyepoint position in world space, the model structure being defined in terms of a plurality of structural features each having predetermined structural attributes, and the simulated vehicle-mounted light source being defined in terms of an origin and a direction in eyepoint space, said method further comprising the steps of:
- a. defining a triangular beam polygon having one apex at the origin of the light source, the beam polygon lying in a plane including an axis through the origin parallel to the said direction, being normal to a line drawn from the eyepoint and intersecting the said axis, and having a defined length and half angle from the said one vertex,
- b. determining second and third vertices of the beam polygon,
- c. determining the intensity of illumination of the beam polygon as a function of distance from the light source, and
- d. displaying the beam polygon on the screen in accordance with its determined vertices and intensity.

10. A method according to claim 9, wherein digital signals representing a plane equation $Ax+By+Cz+D=O$ are generated for the beam polygon from coordinates of the origin of the light source and components of a vector corresponding to the said axis, and digital signals representing the second and third vertices are are generated from the plane equation and the said defined length and half angle.

11. A method according to claim 9, wherein the intensity of illumination of a point on the beam polygon is determined as a function of the angle between the light source direction and a line drawn to that point from the light source.

12. A method according to claim 11, wherein the intensity is determined as a function of the cosine of said angle which is determined from the dot product of a vector representing the said direction of the light source and a vector directed from the light source to the said point of the feature.

13. A method according to claim 12, wherein the intensity is determined as a function of the square of the cosine of said angle which is determined by processing digital electrical signals representing model and simulated light source data as summarized below:

$$\cos^2\theta = \frac{[x_s L_x + y_s L_y + L_z - L_o/z_p]^2}{[srcf^2 - (2/z_p)(x_s X_o + y_s Y_o + Z_o) + L_d/z_p^2]}$$

where $L_x = l_x/d_x$, $L_y = l_y/d_y$, $L_z = l_z$, $X_o = x_o/d_x$, $Y_o = y_o/d_y$, $Z_o = z_o$ ($l_x$, $l_y$, $l_z$) are the components of the vector representing the said direction of the light source ($x_s$, $y_s$) are the screen space coordinates of the said point ($x_o$, $y_o$, $z_o$) are the eyepoint space coordinates of the light source ($x_p$, $y_p$, $z_p$) are the eyepoint space coordinates of the said point srcf is a slant range correction factor $L_o = x_o l_x + y_o l_y + z_o l_z$ $L_d = x_o^2 + y_o^2 + z_o^2$ $d_x$ and $d_y$ are functions of the half angle of the display.

14. A method according to claim 11, wherein digital signals representing illumination intensities are stored in a digital data addressable memory for each of a predetermined number of sample angles in a look up table, and the stored values in addressable memory are addressed by said angle to derive the appropriate illumination intensities.

15. A method according to claim 14, wherein the stored values in addressable memory are addressed by the square of said angle to derive the illumination intensity by interpolation between two values thus read out from the memory.

16. A method according to claim 11, wherein digital signals representing range attenuation factors are stored in a look up table in an addressable memory, and the stored signals are addressed by the product of the square of the distance from the light source to the point and the square of the said angle to derive the appropriate range attenuation factor.

17. An apparatus for displaying an image simulating the illumination effects of a vehicle-mounted light source in an image displayed on a screen, the image being intended to represent the appearance of a model structure which is defined in a digital signal database in world space coordinates, from an eyepoint position in world space, the model structure being defined in terms of a plurality of structural features each having predetermined structural attributes, and the simulated vehicle-mounted light source being defined in terms of an origin and a direction in eyepoint space, said apparatus comprising digital signal processing circuits and addressable digital signal memory devices including:

a. means for determining, for each structural feature potentially contributing to the displayed image, the angular position of a point on that structural feature relative to the light source as the angle between the light source direction and a line drawn to that point from the light source, b. means for determining an illumination intensity for that point by reference to said angle, c. means for reducing the illumination intensity as a function of the distance from the eyepoint to said point to provide a resultant intensity, and d. means for modulating the attributes of the structural feature at said point in a displayed image on said screen as a function of said resultant intensity.

18. An apparatus as in claim 17 for displaying an image simulating the illumination effects on the atmosphere of a vehicle-mounted light source in an image displayed on a screen, the image being intended to represent the appearance of a model structure which is defined in a digital signal database in world space coordinates from an eyepoint position in world space, the model structure being defined in terms of a plurality of structural features each having predetermined structural attributes, and the simulated vehicle-mounted light source being defined in terms of an origin and a direction in eyepoint space, said apparatus further comprising:

a. means for defining a triangular beam polygon having one apex at the origin of the light source, the beam polygon lying in a plane coincident with an axis through the origin parallel to the said direction, being normal to a line drawn from the eyepoint and intersecting the said axis, and having a defined length and half angle from the said one vertex, b. means for determining second and third vertices of the beam polygon, c. means for determining the intensity of illumination of the beam polygon as a function of distance from the eyepoint, and d. means for displaying the beam polygon on the screen in accordance with its determined vertices and intensity.

* * * * *